United States Patent [19]

Cooper et al.

[11] 4,169,114

[45] Sep. 25, 1979

[54] PROCESS FOR IMPROVING THE COLOR OF RESINOUS COMPOSITIONS

[75] Inventors: Glenn D. Cooper, Delmar; Daniel E. Floryan, Glenmont, both of N.Y.; Irwin Schraga, Heide-Kalmthout, Belgium

[73] Assignee: General Electric Company, Pittsfield, Mass.

[21] Appl. No.: 884,155

[22] Filed: Mar. 7, 1978

[51] Int. Cl.$^2$ .............................................. C08G 65/46
[52] U.S. Cl. ...................................... 525/68; 528/211; 528/212; 528/215; 528/217; 528/490; 528/492; 525/152; 525/379; 528/492
[58] Field of Search ............... 528/492, 211, 212, 215, 528/217, 490; 260/874

[56] References Cited

U.S. PATENT DOCUMENTS

| 3,306,874 | 2/1967 | Hay | 528/211 |
|---|---|---|---|
| 3,573,257 | 3/1971 | Nakashio et al. | 528/211 |
| 3,663,661 | 5/1972 | Katchman | 260/892 |

*Primary Examiner*—Lester L. Lee
*Attorney, Agent, or Firm*—Morgan, Finnegan, Pine, Foley & Lee

[57] ABSTRACT

There is provided a process for improving the color of resinous compositions consisting of, or including, polyphenylene ether resins by contacting such resins with an amine. The process is carried out generally at elevated temperatures and pressures with either a primary, secondary or tertiary amine.

40 Claims, No Drawings

PROCESS FOR IMPROVING THE COLOR OF RESINOUS COMPOSITIONS

This invention relates to resinous compositions. More particularly, the invention relates to a process for improving the color of resinous compositions consisting of, or including, polyphenylene ether resins by contacting the resins, in the form of a finely divided solid, with an amine.

BACKGROUND OF THE ART

It is known that polyphenylene ether resins, and particularly the 2,6-dialkyl substituted polyphenylene ether resins very often contain color bodies, generally yellow or yellowish as the resin is produced. For example, when polyphenylene ether is prepared by oxidation of 2,6-xylenol and then recovered from the reaction mixture by total isolation procedures such as steam precipitation, spray-drying or crumbing in hot water, the product is a deep yellow to orange in color due to the presence of quinones and other colored by-products in the reaction mixture. Moreover, these color bodies are carried through into the final shaped articles produced therefrom. Consequently, the color bodies are a major problem with respect to the utilization of total isolation procedures, such as spray drying, hot water crumbing, or steam precipitation which procedures are used to separate polyphenylene ether resins from their reaction solutions. In any event, the presence of the color bodies makes the polyphenylene ether resins and compositions including them undesirable for many uses, unless the color can be decreased or eliminated.

There exists, therefore, a need for providing polyphenylene ether resins or compositions including them which do not present the problems mentioned above with respect to color. The present invention fulfills that need.

DESCRIPTION OF THE INVENTION

In accordance with the present invention there is provided a process for improving the collor of a resinous composition consisting of or including a colored polyphenylene ether resin comprising contacting the colored polyphenylene ether resin in the form of a finely divided solid with an effective amount of amine for a time at least sufficient to reduce the color of the composition to an acceptable level.

The term "polyphenylene ether resins" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents the polyphenylene ethers are prepared by an oxidative coupling reaction comprising passing an oxygen-containing gas through a reaction solution of a phenol and a metal-amine complex catalyst. Other disclosures relating to processes using metal-amine catalysts are found in Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,116; Horie et al, U.S. Pat. No. 3,384,619; Faurote et al, U.S. Pat. No. 3,440,217; and disclosures relating to metal based catalysts which do not include amines, such as Wieden et al, U.S. Pat. No. 3,442,885 (copper-amidines); Kanashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolates ion with an initiator, such as a peroxy acid salt, an acid peroxide, a hypohalite, and the like, in the presence of a complexing agent. Disclosures relating to noncatalytic processes, such as oxidation with lead dioxide, silver oxide, etc., are described in Price et al, U.S. Pat. No. 3,382,212. All of the above-mentioned disclosures are incorporated herein by reference.

The term "resinous compositions" in its broadest sense includes various copolymers and blends of the polyphenylene ethers formed by interpolymerization with other monomers or polymers, such as the polyolefins, polystyrenes, polycarbonates and the like, wherein the polyphenylene ether component is present in an amount sufficient to adversely affect the color of the composition, without some treatment to effect removal of the color bodies. Among the most important of such resinous compositions are blends of polyphenylene ethers with styrene resins, including rubber modified polystyrene resins, and graft copolymers of polyphenylene ether resins with styrene resins, including styrene homopolymer resins, and the like. These are described, for example, in Cizek, U.S. Pat. No. 3,383,435, which is incorporated herein by reference. Compositions of polyphenylene ether and polystyrene and of rubber modified polystyrene can also be prepared by the oxidation of the corresponding phenol, e.g., 2,6-dimethyl phenol, in a solution of polystyrene or of polystyrene and a rubber, see, for example, Katchman, U.S. Pat. No. 3,663,661, the disclosure of which is incorporated herein by reference. Reaction mixtures containing graft copolymers of polyphenylene ether resins and styrene resins can also be made by polymerization of vinyl aromatic monomers in the presence of polyphenylene ethers, for example, according to the disclosure in Fox, Canadian Pat. No. 785,834, which is incorporated herein by reference.

In general, the preferred polyphenylene ether resins will be of the formula

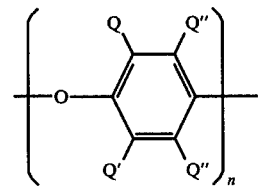

wherein Q is a monovalent substituent such as hydrogen, a hydrocarbon radical, a halohydrocarbon radical having at least two carbon atoms between the halogen atom and the phenol nucleus, hydrocarbonoxy radicals and halohydrocarbonoxy radicals having at least two carbon atoms between the halogen atom and the phenyl nucleus, Q' and Q" are the same as Q and in addition, halogen, with the proviso that Q, Q' and Q" are all free of a tertiary alpha-carbon atom, and n is a whole integer equal to at least 50.

With respect to resinous compositions, which include a polyphenylene ether as one of the components, the other component is preferably a combined styrene resin or the composition can also contain a grafted interpolymerization product, e.g., as can be obtained by co-extrusion of the polyphenylene ether resin and the styrene resin at elevated temperatures, e.g., from 450° to 550° F., or by one of the other techniques mentioned above.

The preferred styrene resin is one having at least 25% by weight of its polymer units derived from a vinyl aromatic compound of the formula:

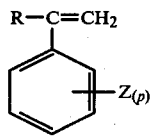

wherein R is hydrogen, lower-, e.g., $C_1$–$C_6$, alkyl or halogen; Z is vinyl, hydrogen, chloride or lower alkyl; and p is 0 or a whole number of from 1 to 5. The term "styrene resin" as used herein and in the appended claims, and as defined by the above formula, includes illustratively, homopolymers, such as polystyrene and polychlorostyrene, the rubber modified polystyrenes, such as rubber modified high impact polystyrene, and the styrene containing copolymers, such as the styrene-acrylonitrile copolymers (SAN), styrene-butadiene copolymer, styrene-acrylonitrile-butadiene terpolymers (ABS), poly-α-methylstyrene, copolymers of ethylvinylbenzene and divinyl benzene and the like. The most preferred styrene resins are the styrene homopolymers and the rubber modified high impact polystyrenes.

The polyphenylene ether-forming reaction can be carried out under a wide variety of well known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25° to 50° C. The degree of polymerization is primarily controlled by the reaction time, although catalyst activity, promoters, temperature, oxygen flow rate and other parameters have known effects. After the desired degree of polymerization has been achieved, the reaction is terminated, e.g., by contacting the reaction mixture with an acidic solution. To save unnecessarily detailed explanation of these known process details, reference is made to the above-mentioned Hay patents.

In one process for making the polyphenylene ether resins, they are produced by treating a solution of the corresponding phenol, optionally substituted with chlorine, bromine or iodine in the para-position, with an oxygen-containing gas in the presence of a metal-amine complex catalyst. The metal component can comprise copper, manganese, cobalt, nickel, vanadium, chromium and salts thereof, but copper is preferred. Primary, secondary and tertiary amines may be used as the amine component of the catalyst. The reaction solvent can be water-soluble, such as pyridine, but to facilitate removal of the copper-catalyst by extraction with aqueous solutions of acids such as hydrocloric or sulfuric acid, or organic acids such as acetic acid, or carbon dioxide, it is preferred to use a water immiscible reaction solvent such as a halogenated aliphatic solvent, e.g., trichloroethylene, or an aromatic solvent, e.g., benzene, toluene, xylene, chlorobenzene, nitrobenzene, and the like. Especially preferred solvents are aromatic hydrocarbons, e.g., toluene or benzene.

Amines which can be employed in carrying out the decolorizing process of this invention can vary widely. Generally such amines include primary, secondary and teriary amines and preferably primary, secondary and tertiary alkylamines wherein the alkyl radical is lower alkyl and generally contains from about 1 to 6 carbon atoms. Exemplary of amines which can be employed in the practice of this invention are mono, di, and tri-methyl amines; mono, di, and tri-ethyl amines; mono, di, tri-n-propyl amines; mono, di, and tri-n-butyl amines, mono, di and tri-n-amyl amines; mono, di and tri-n-hexyl amines and the like. In the practice of the present invention, however, the secondary amines are generally preferred.

The amount of amine utilized in carrying out the process of this invention can also vary widely. Generally at least enough must be used for the amine to be effective, this amount being by weight, based on the total amount of polyphenylene ether resin or compositions including the same, in a resin composition. Preferably, however, the amine is utilized in a range of from about 1% by weight to about 50% by weight, based on the total weight of the composition and most preferably is employed in an amount in a range of from about 2% by weight to 25% by weight. Moreover, it is to be noted that any excess amine which is present in a reaction mixture employed in carrying out the process of this invention can readily be recovered simply by distillation, or, when the resin is treated in the form of a suspension in water, by decanting the amine from the water after separation of the resin.

In general, the process of this invention can be carried out simply by bringing the polyphenylene ether resin and amine in contact with each other for a time sufficient to reduce color of the polyphenylene ether resin to an acceptable level after the resin has been recovered from a reaction mixture by total isolation procedures such as steam precipitation, spray drying or crumbing in hot water. Generally, however, the process is normally carried out by contacting solid polyphenylene ether resin with the amine at elevated temperatures, vapors of the amine reacting with the resin.

The temperature at which the process is accomplished can vary widely, generally being in a range from about 30° C., up to the temperature at which the resin softens and sticks together, reducing the surface area available for reaction. Preferably, however, the process is achieved at temperatures in a range of about 50° to 100° C.

A particularly convenient procedure for decolorizing resins isolated by steam precipitation or hot water crumbing is to suspend the moist polymer in a small amount of water, add the amine, and heat the mixture under reflux, with vigorous stirring. After the desired decolorization has taken place, the excess amine can usually be removed by steam distillation and recovered by decanting from the water layer.

In general, elevated pressures are not required for satisfactory decolorization, but may be necessary with amines of high volatility in order to achieve a sufficiently high reaction temperature.

DESCRIPTION OF THE PREFERRED EMBODIMENTS

In order to illustrate the present invention more fully, the following examples are set forth. It is to be understood that these examples are illustrative only and they are not to be construed to limit the invention to the particular embodiments set forth therein. In the examples all parts and percents are by weight unless otherwise indicated.

Polymer color is evaluated by measuring percent transmission at 425 millimicrons of a 2% solution in chloroform, using a Coleman Model 295 visible spectrophotometer. The higher the percent transmission, the lower the color in the resin. The color number of the polymeric resin is determined as 1/10(100-% transmission).

EXAMPLE 1

A polyphenylene ether resin is prepared and isolated by crumbing in hot water in accordance with the following procedure.

A polymerization catalyst is prepared by adding a solution of 0.615 g. of cupric bromide in 4 ml. of methanol to 16.5 g. of di-n-butyl amine in 50 ml. of toluene. The catalyst is transferred with 320 ml. of toluene to a one-liter reactor equipped with cooling coils, return condenser and an oxygen inlet tube, and stirred at 1500 r.p.m. by means of a turbine stirrer.

Oxygen is introduced to the reactor at the rate of 15 cu.ft./hr. while a solution of 140 g. of 2,6-xylenol in 160 ml. of toluene is pumped into the reactor through a metering pump over a period of 55 minutes. 50 ml. of toluene is then added through the pump. The temperature is maintained at 30° C. by circulating water from a constant temperature bath through the cooling coil. One hour after the beginning of reaction, the temperature is increased to 40° C. and the oxygen flow rate reduced to 0.5 cu.ft./hr. Two hours after the beginning of the reaction the mixture is diluted with an equal volume of toluene and 60 ml. of 50% aqueous acetic acid is added to terminate the reaction and extract the copper-amine catalyst. The polymer so prepared is then isolated by adding the toluene solution thereof to vigorously stirred boiling water through a spray nozzle immersed in the water. The polymer, light orange in color, is then filtered off and dried at about 150° C. The color of the resin, determined as above indicated, is 9.6. This resin is used as the control for comparison of color with resin treated with amines as set forth in the following Examples.

EXAMPLE 2

Ten grams of the colored resin of Example 1 is placed in a pressure bottle under a blanket of nitrogen with 0.5 ml. of d-n-butyl amine. The bottle is then placed in an oven and heated for one hour at 150° C., just slightly below the boiling point of the amine. The polymer changes from orange to light tan in color and has a color number of 7.6, determined as indicated above, a distinct improvement over that of the control resin of Example 1.

EXAMPLE 3

A series of samples are prepared containing 10 grams of the isolated colored resin of Example 1, 50 ml. of water and 3 ml. of each of the amines set forth in the following table. The polymer, water and amine mixture is boiled under reflux for one hour and the polymer then filtered off and dried in an oven at about 150° C. The color numbers of the resins and the particular amine used therewith are set forth in the following table along with the color number of the control from Example 1 in which no amine is utilized.

TABLE

| AMINE | POLYMER COLOR NUMBER |
| --- | --- |
| none | 9.6 |
| di-n-butyl amine | 6.2 |
| di-n-propyl amine | 6.1 |
| n-butyl amine | 9.4 |
| triethyl amine | 8.0 |

As can be seen from the above table, the polymer samples contacted with di-n-butyl amine and di-n-propyl amine have excellent reduction in color. Moreover, even those samples which are contacted with n-butyl amine and triethyl amine, which are primary and tertiary amines, respectively, show a distinct reduction in color in comparison with the control where no amine is employed.

EXAMPLE 4

A polyphenylene ether reaction mixture, prepared and extracted as described in Example 1, was diluted with enough toluene to produce a solution containing 10% by weight of the polyphenylene ether. This solution was mixed with an equal weight of a 10% solution of Foster Grant 834 rubber modified polystyrene and the mixture of resins was isolated by crumbing in hot water as described in Example 1. A portion of the product was suspended in water and heated with di-n-butyl amine in an amount equal to 10% by weight of the resin, as described in Example 3. Solutions of the resins in chloroform are turbid, due to the presence of insoluble cross-linked rubber particles in the rubber-modified polystyrene, so that color measurements on the solutions are not useful, but the color of the resin changes from bright orange to light yellow upon treatment with the amine.

EXAMPLE 5

A polyphenylene ether reaction mixture was prepared, and the polymer isolated by crumbing in hot water as described in Example 1, except that the catalyst, instead of dibutyl amine and cupric bromide, was a mixture of cuprous oxide, 48% aqueous hydrobromic acid, N, N'-di-tert-butylethylenediamine, and n-butyldimethyl amine, used at a xylenol:copper:diamine:hydrogen bromide: tertiary amine ratio of 860:1.3:15.40.

The dried polymer had a color number of 9.6. A ten-gram portion of the polymer was heated under reflux for two hours with 100 ml. of water and 1.0 g. of di-n-butyl amine. A Dean Stark trap was added and heating was continued for ten minutes. The recovered dibutyl amine was separated in the Dean Stark trap and recovered; it weighed 0.8 g. The polymer was filtered off and dried; it had a color number of 4.1.

The process was repeated, using 0.5 g. instead of 1.0 g. of di-n-butyl amine. The color number of the recovered polymer was 5.4. In another experiment, using di-isobutyl amine instead of di-n-butyl amine, the color number of the polymer was 6.0.

The present invention provides many advantages. For example, the process of this invention can be carried out with relatively simple apparatus which is readily available in commercial channels and with reactants which are also conveniently available and simple to employ and the process results in the provision of reducing the color of resinous composition consisting of, or including, polyphenylene ether resin. Consequently, shaped articles formed from such resins are not disadvantageously encumbered with the presence of undesirable color bodies which have to be dealt with by special treatments in order to disguise their existence or to neutralize the effects of the same.

Numerous modifications and variations of the present invention can be made without departing from the spirit and scope thereof. It is to be understood, therefore, that this invention is not be limited to the particular embodiments described herein except as defined in the appended claims.

We claim:

1. A process for improving the color of a resinous composition consisting of or including a colored polyphenylene ether resin comprising contacting said colored polyphenylene ether resin in the form of a finely divided solid with by weight, based on the total weight of said colored polyphenylene ether resin, an effective amount of an amine for a time at least sufficient to reduce the color of the composition to an acceptable level.

2. A process according to claim 1 wherein the resinous composition comprises a polyphenylene ether, a blend of a polyphenylene ether and a styrene resin or a graft copolymer of a polyphenylene ether and a styrene resin.

3. A process according to claim 2 wherein the polyphenylene ether is poly(2,6-dimethyl-1,4-phenylene)ether.

4. A process according to claim 2 wherein the blended or grafted styrene resin is a styrene homopolymer resin.

5. A process according to claim 2 wherein the blended or grafted styrene resin is a rubber modified high impact resin.

6. A process according to claim 1 including contacting the colored polyphenylene ether resin with the amine at elevated temperatures.

7. A process according to claim 6 wherein the colored polyphenylene ether resin and the amine are heated to a temperature up to about the softening point of the resin.

8. A process according to claim 1 including contacting the colored polyphenylene ether resin with the amine under pressure.

9. A process according to claim 1 wherein the amine is selected from the group consisting of primary, secondary and tertiary alkylamines.

10. A process according to claim 9 wherein the amine is a primary alkylamine.

11. A process according to claim 10 wherein the amine is n-butyl amine.

12. A process according to claim 9 wherein the amine is a secondary alkylamine.

13. A process according to claim 12 wherein the amine is di-n-propyl amine.

14. A process according to claim 9 wherein the amine is a teritary amine.

15. A process according to claim 14 wherein the amine is triethyl amine.

16. A process for decolorizing a resinous composition consisting of or including a colord polyphenylene ether resin comprising forming a suspension of said colored polyphenylene ether resin in the form of a finely divided solid in water, contacting the suspension with by weight, based on the total weight of said polyphenylene ether resin, heating the suspension to a temperature up to about the softening point of the resin for a time at least sufficient to reduce the color of the composition to an acceptable level and obtaining a decolorized resinous composition.

17. A process according to claim 16 wherein the resinous composition comprises a polyphenylene ether, a blend of a polyphenylene ether and a styrene resin or a graft copolymer of a polyphenylene ether and a styrene resin.

18. A process according to claim 17 wherein the polyphenylene ether is poly(2,6-dimethyl-1,4-phenylene)ether.

19. A process according to claim 17 wherein the blended or grafted styrene resin is a styrene homopolymer resin.

20. A process according to claim 17 wherein the blended or grafted styrene resin is a rubber modified high impact resin.

21. A process according to claim 16 wherein the amine is selected from the group consisting of primary, secondary and tertiary alkylamines.

22. A process according to claim 21 wherein the amine is a primary alkylamine.

23. A process according to claim 22 wherein the amine is n-butyl amine.

24. A process according to claim 21 wherein the amine is a secondary alkylamine.

25. A process according to claim 24 wherein the amine is di-n-propyl amine.

26. A process according to claim 21 wherein the amine is a tertiary amine.

27. A process according to claim 21 wherein the amine is triethyl amine.

28. A process for improving the color of a resinous composition consisting of or including a colored polyphenylene ether resin comprising contacting said resinous composition in the form of a finely divided solid with about 1% to about 50% by weight, based on the total weight of said colored polyphenylene ether resin, of an amine, at a temperature of from about 30° C. up to the temperature at which said resinous composition softens and sticks together and for a time at least sufficient to reduce the color of the composition to an acceptable level and obtaining a decolorized resinous composition.

29. A process according to claim 28 wherein the resinous composition comprises a polyphenylene ether, a blend of a polyphenylene ether and styrene resin or a graft copolymer of a polyphenylene ether and a styrene resin.

30. A process according to claim 29 wherein the polyphenylene ether is poly(2,6-dimethyl-1,4-phenylene)ether.

31. A process according to claim 29 wherein the blended or grafted styrene resin is a styrene homopolymer resin.

32. A process according to claim 29 wherein the blended or grafted styrene resin is a rubber modified high impact resin.

33. A process accordng to claim 28 including contacting the colored polyphenylene ether resin with the amine under pressure.

34. A process according to claim 28 wherein the amine is selected from the group consisting of primary, secondary and tertiary alkylamines.

35. A process according to claim 34 wherein the amine is a primary alkylamine.

36. A process according to claim 35 wherein the amine is n-butyl amine.

37. A process according to claim 34 wherein the amine is a secondary alkylamine.

38. A process according to claim 37 wherein the amine is di-n-propyl amine.

39. A process according to claim 34 wherein the amine is a tertiary amine.

40. A process according to claim 34 wherein the amine is triethyl amine.

* * * * *

UNITED STATES PATENT AND TRADEMARK OFFICE
CERTIFICATE OF CORRECTION

PATENT NO. : 4,169,114

DATED : September 25, 1979

INVENTOR(S) : Glenn D. Cooper; Daniel E. Floryan; Irwin Schraga

It is certified that error appears in the above-identified patent and that said Letters Patent are hereby corrected as shown below:

Col. 1, line 42, "collor" should read --color--;

Col. 2, line 5, "phenolates" should read --phenolate--;

Col. 4, line 1, "teriary" should read --tertiary--;

Col. 6, line 46, "860:1.3:15.40" should read --860:1.3:15:40--

Signed and Sealed this

Twenty-ninth Day of April 1980

[SEAL]

Attest:

Attesting Officer

SIDNEY A. DIAMOND

Commissioner of Patents and Trademarks